United States Patent Office 2,727,058
Patented Dec. 13, 1955

2,727,058

COMPLETELY HALOGENATED PHOSPHATE ESTERS AND THE METHOD OF MAKING THE SAME

James C. Conly, Santa Monica, Calif., assignor to Douglas Aircraft Company, Inc., Santa Monica, Calif.

No Drawing. Application October 3, 1950, Serial No. 188,263

11 Claims. (Cl. 260—461)

This invention relates to completely halogenated phosphate esters as new compositions of matter or new chemical compounds and to a method of making them.

Phosphate esters partially halogenated to a minor degree are known. However, it has now been discovered that completely halogenated phosphate esters in accordance with my invention have surprising and unexpected properties, particularly when used in connection with flame-resistant materials and fluids, and especially fire-resistant hydraulic fluids.

The completely halogenated phosphate esters of my invention may be represented by the general formula

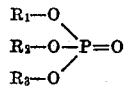

where $R_1$, $R_2$ and $R_3$ may be the same or each different and may be alkyl, aryl, or alkoxy-alkyl radicals having from 1 to 10 carbon atoms, preferably from about 4 to 8 carbon atoms where in each case halogen atoms take the place of all hydrogen atoms.

In accordance with my invention these new chemical compounds are made by making the phosphate esters by methods known in the art from alcohols or phenols which may or may not be completely halogenated. If not completely halogenated the remaining hydrogen atoms of the phosphate ester may be substituted with halogen atoms by the usual methods of halogenation.

My invention will be illustrated by the following examples:

*Example 1.*—In this example 2,2,3,3,4,4,4-heptafluorobutyl alcohol was reacted with phosphorous oxychloride in the presence of benzene and pyridine to give the phosphate ester of this alcohol. The tris-heptafluorobutyl phosphate was then completely halogenated by substituting chlorine for the remaining hydrogen. This was done by subjecting to the action of chlorine at room temperature while irradiating with actinic light with liberation of hydrogen chloride. This was continued until the phosphate was completely halogenated as indicated by the cessation of evolution of hydrogen chloride. The resulting product was purified by crystallization and tris 1,1-dichloro-2,2,3,3,4,4,4-heptafluorobutyl phosphate was obtained in the form of hexagonal plates. It melted at 91–93° C., and was found to be soluble in such organic solvents as ether, alcohol, carbon tetrachloride, chloroform, and acetone. It was found to have a very high resistance to fire and is useful for imparting fire-resistance to hydraulic fluids and other materials.

*Example 2.*—Di-(1,1-dichloro-2,2,3,3,4,4,4-heptafluorobutyl) pentachlorophenyl phosphate is made by using 2,2,3,3,4,4,4-heptafluorbutanol and phenol to make di-(2,2,3,3,4,4,4-heptafluorbutyl) phenyl phosphate which in turn is chlorinated in the presence of carbon tetrachloride as a solvent in the manner indicated in Example 1 above. The resulting product has a high degree of fire-resistance and is capable of imparting a high degree of fire-resistance to other materials or fluids in which it was incorporated.

*Example 3.*—$(CClF_2.CF_2.O.CCl_2.CCl_2.O)_3PO$ is made by making the corresponding phosphate from $$CHF_2.CF_2.O.CH_2.CH_2OH$$ 

and the phosphate chlorinated as indicated above. This resulting product has a high degree of fire-resistance and is capable of imparting a high degree of fire-resistance to other materials or fluids in which it was incorporated.

The foregoing describes my invention in its preferred aspects, and illustrates my invention by way of specific examples, but alterations and modifications may be made thereof without departing from the invention herein disclosed.

I claim:

1. The new chemical compounds represented by the formula:

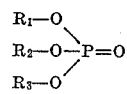

in which $R_1$, $R_2$ and $R_3$ are radicals selected from the group consisting of alkyl, aryl, and alkoxy-alkyl having from 1 to 10 carbon atoms in which all the hydrogens are completely replaced with fluorine and chlorine.

2. The new chemical compounds represented by the formula

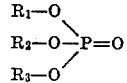

in which $R_1$, $R_2$ and $R_3$ are alkyl radicals having from 4 to 8 carbon atoms in which all hydrogen atoms are replaced by fluorine and chlorine atoms.

3. The new chemical compounds represented by the formula

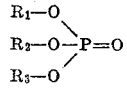

in which $R_1$, $R_2$ and $R_3$ are aryl radicals having up to 10 carbon atoms in which all hydrogen atoms are replaced by fluorine and chlorine atoms.

4. The new chemical compounds represented by the formula

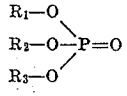

in which $R_1$, $R_2$ and $R_3$ are alkoxy-alkyl radicals having from 4 to 8 carbon atoms in which all hydrogen atoms are replaced by fluorine and chlorine atoms.

5. The new chemical compound tris 1,1-dichloro-2,2,3,3,4,4,4-heptafluorobutyl phosphate.

6. The new chemical compound represented by the formula $(CClF_2.CF_2.O.CCl_2.CCl_2.O)_3PO$.

7. The new chemical compound di-(1,1-dichloro-2,2,3,3,4,4,4-heptafluorobutyl) pentachlorphenyl phosphate.

8. The method of making a phosphate ester in which all hydrogen atoms are replaced with fluorine and chlorine which comprises making a phosphate of a partially fluorinated member of the group consisting of alcohols and phenols and then chlorinating the resulting phosphate to replace all remaining hydrogen with chlorine.

9. The method as defined in claim 8 in which said partially fluorinated member is represented by the formula $CHF_2.CF_2.O.CH_2.CH_2OH$.

10. The method as defined in claim 8 in which said partially fluorinated member is 2,2,3,3,4,4,4-heptafluorobutanol and phenol and said resulting phosphate is di-(2,2,3,3,4,4,4-heptafluorobutyl) phenyl phosphate.

11. The method of making tris 1,1-dichloro-2,2,3,3,4,4,4-heptafluorobutyl phosphate which comprises making tris 2,2,3,3,4,4,4-heptafluorobutyl phosphate by reacting 2,2,3,3,4,4,4-heptafluorobutyl alcohol with phosphorus oxychloride and substituting chlorine atoms for all the remaining hydrogen atoms on each of said butyl radicals to produce tris 1,1-dichloro-2,2,3,3,4,4,4-heptafluorobutyl phosphate.

References Cited in the file of this patent

UNITED STATES PATENTS

| | | |
|---|---|---|
| 2,451,375 | Bell | Oct. 12, 1948 |
| 2,559,749 | Benning | July 10, 1951 |

FOREIGN PATENTS

| | | |
|---|---|---|
| 3,053 of 1914 | Great Britain | May 21, 1941 |

OTHER REFERENCES

Swarts: Rec. Trav. Chim., vol. 28, pp. 166–170 (1909).
Groggins: Unit Processes in Organic Synthesis, 2nd ed., 6th impression, pp. 156–159, 204–206.